United States Patent [19]

Maehara

[11] Patent Number: 5,069,508

[45] Date of Patent: Dec. 3, 1991

[54] BRAKE HYDRAULIC PRESSURE CONTROL APPARATUS

[75] Inventor: Toshifumi Maehara, Saitama, Japan

[73] Assignees: Akebono Brake Industry Co., Ltd., Tokyo; Akebono Research and Development Centre Ltd., Saitama, both of Japan

[21] Appl. No.: 466,636

[22] Filed: Jan. 17, 1990

[30] Foreign Application Priority Data

Jan. 18, 1989 [JP] Japan ................................ 1-7746

[51] Int. Cl.⁵ .............................................. B60T 8/06
[52] U.S. Cl. .................................. 303/113 TR; 303/93
[58] Field of Search ............... 303/113, 114, 115, 116, 303/119, 93, 110

[56] References Cited

U.S. PATENT DOCUMENTS

| 4,796,958 | 1/1989 | Brown ............................ 303/113 R |
| 4,813,448 | 3/1989 | Leiber ........................ 303/113 R X |
| 4,867,509 | 9/1989 | Maehara et al. ..................... 303/92 |

Primary Examiner—Matthew C. Graham
Attorney, Agent, or Firm—Finnegan, Henderson, Farabow, Garrett and Dunner

[57] ABSTRACT

A brake hydraulic pressure control apparatus providing anti-lock control for preventing the locking of vehicle wheels during braking and providing traction control to prevent slipping of the vehicle wheels during starting or accelerating of the vehicle, the apparatus comprises a master cylinder assembly including a body portion and an adaptor portion removably attached to an end of the body portion. A distributor assembly removably attached to the master cylinder assembly includes a predetermined number of control channels for controlling vehicle wheels and a predetermined number of electromagnetic valves corresponding to the predetermined number of control channels. The electromagnetic valves are disposed in hydraulic passages for performing anti-lock and traction control on the vehicle wheels. An anti-lock control electromagnetic valve having opposed ends is disposed between the body portion and the adaptor portion, wherein the anti-lock control valve includes a first and second ports. A first receiving portion formed in the master cylinder body portion removably receives the first port of the anti-lock control valve. A second receiving portion formed in the adaptor portion removably receives the second port of the anti-lock control valve. The apparatus further comprises a traction control valve removably disposed between the arm portion of the reservoir and an upper portion of the adaptor portion.

14 Claims, 9 Drawing Sheets

BRAKE HYDRAULIC PRESSURE CONTROL APPARATUS

BACKGROUND OF THE INVENTION

1. Field of the Invention

The present invention relates to a brake hydraulic pressure control apparatus for use with an anti-lock control for preventing the locking of vehicle wheels during braking and for traction control for preventing the slipping of driving wheels during starting or acceleration of the vehicle.

2. Description of the Prior Art

In an anti-lock control apparatus for preventing the locking of wheels during braking of a vehicle to assure security of steering properties and running stability of the vehicle and for reducing braking distance, the control modes of the apparatus (i.e., a pressurization mode, a pressure reducing mode, and a hold mode) for controlling brake hydraulic pressure area determined based on an electric signal expressing the wheel speed obtained from the wheels and speed sensors, so that the brake hydraulic pressure is controlled by a micro-computer by opening or closing hold valves (i.e., pressurizing/holding valves) and decay valves (i.e., pressure reducing valves), which are constituted by electromagnetic valves, in accordance with the control modes so as to pressurize, maintain or reduce the brake hydraulic pressure.

In general, a brake hydraulic pressure control apparatus in which a hydraulic control portion (modulator) for performing the aforementioned anti-lock control is combined integrally with a master cylinder. In the apparatus of this type, as disclosed in U.S. Pat. No. 4,641,895, the master cylinder has primary and secondary pistons arranged in series tandem to each other, so that hydraulic pressures for two braking systems are controlled by the two pistons. The apparatus further has normally opened hold valves provided in hydraulic passages connected between two hydraulic pressure chambers and wheel cylinders, the hydraulic pressures of the chambers being controlled by the two pistons, and normally closed decay valves provided in hydraulic passages connecting the wheel cylinders with a reservoir.

In such a configuration, the hydraulic pressures in the respective hydraulic pressure chambers of the master cylinder are transmitted to the wheel cylinders through the hold valves upon depression of a brake pedal, so that the hydraulic pressures in the wheel cylinders increase to apply braking force to the wheels. When anti-lock control is started, the hold valves are closed to maintain the brake hydraulic pressures, and further, the decay valves are opened when the hold valves are closed. As a result, the brake liquid in the wheel cylinders escapes into the reservoir through the decay valves, so that the hydraulic pressures in the wheel cylinders are reduced to reduce the braking force. On the other hand, at the time of pressurization in anti-lock control, the hold valves are opened, and at the same time, the pistons are operated by high-pressure brake fluids supplied from a hydraulic pressure source such as an accumulator, to thereby increase hydraulic pressures in the wheel cylinders.

However, a shortage of braking force occurs in the case where a failure arises in the hydraulic pressure source systems, such as a hydraulic pressure pump. To compensate for the shortage of braking force, further depression of the brake pedal is required. There arises a problem in that the depth of the brake pedal required for depressing the pedal cannot be obtained.

The applicant of the present application has proposed a brake hydraulic pressure control apparatus as in the specification of commonly assigned U.S. Pat. application Ser. No. 07/261,201 now U.S. Pat. No. 4,867,509 to solve the aforementioned problem. The proposed apparatus comprises: hydraulic passages for connecting the hydraulic pressure chambers of the master cylinder and the accumulator; a normally closed supply valve provided in the middle of the hydraulic passages and operated so as to be opened only at the time of anti-lock control or traction control; intake valves provided in opening portions of the hydraulic passages leading into the hydraulic pressure chambers, the intake valves having forward end portions which do not project into the hydraulic pressure chambers ordinarily but project into the hydraulic pressure chambers only at the time of traction control to close the opening portions to thereby interrupt the hydraulic passages; and valve operating members provided in the pistons of the master cylinder to move together with the pistons to engage with the forward end portions of the intake valves when the stroke of the piston reaches a predetermined value, to thereby open the intake valves.

According to the proposed brake hydraulic pressure control apparatus, the valve operating members open the intake valves as the pistons of the master cylinder move. Accordingly, high-pressure brake fluid is fed into the hydraulic pressure chambers of the master cylinder during anti-lock or traction control when the supply valves are open. As a result, the pistons are returned to set positions and maintained in the set position. Accordingly, the depth of the brake pedal sufficient for depression can be secured in the case where some failure arises in the hydraulic pressure source systems. Accordingly, hydraulic pressures proportional to the force of depressing the brake pedal are fed to the wheel cylinders to attain the necessary braking force.

In the brake hydraulic pressure control apparatus having the aforementioned configuration, a hydraulic passage leading from the downstream side of the supply valve into the reservoir is provided and, further, an anti-lock control normally opened electromagnetic valve is provided in the hydraulic passage so that the hydraulic passage leading into the reservoir is cut off by closing the electromagnetic valve during anti-lock control to feed hydraulic pressure from the accumulator into the hydraulic pressure chambers of the master cylinder through the intake valves.

However, bolts, clips or the like must be used for attaching the anti-lock control electromagnetic valve to the master cylinder. Furthermore, pipings for connecting the electromagnetic valves and the hydraulic passages of the master cylinder are required. Accordingly, not only are the number of parts increased but both additional labor and space for attachment are required.

In addition to the aforementioned arrangement, the brake hydraulic pressure control apparatus described in the specification of the commonly assigned U.S. Pat. application Ser. No. 07/261,201 has a traction control auxiliary hydraulic pressure chamber provided with a sleeve-shaped auxiliary piston at one end of the master cylinder, so that the downstream side of the anti-lock control electromagnetic valve is not connected to the reservoir but is connected to the auxiliary hydraulic pressure chamber. At the time of traction control, the hydraulic pressure from the accumulator is fed to the auxiliary hydraulic pressure chamber to operate the auxiliary piston to thereby operate the pistons of the master cylinder.

However, in the case where maximum necessary hydraulic pressure at the time of traction control is changed, either an interchange of the whole master cylinder or the addition of new parts are required.

SUMMARY OF THE INVENTION

It is therefore an object of the present invention to provide a brake hydraulic pressure control apparatus having a structure suitable to attach the anti-control electromagnetic valve.

Another object of the invention to provide a brake hydraulic pressure control apparatus in which maximum necessary hydraulic pressure at the time of traction control can be adjusted easily.

In accordance with the invention, a brake hydraulic pressure control apparatus providing anti-lock control for preventing the locking of vehicle wheels during braking and providing traction control to prevent slipping of the vehicle wheels during starting or accelerating of the vehicle, the apparatus comprises a master cylinder assembly including a body portion and an adaptor portion removably attached to an end of the body portion, hydraulic passages within the master cylinder assembly. A distributor assembly removably attached to the master cylinder assembly includes a predetermined number of control channel means for controlling vehicle wheels, a predetermined number of hydraulic passages, and a predetermined number of electromagnetic valves corresponding to the predetermined number of control channel means. The electromagnetic valves being disposed in the hydraulic passages for performing anti-lock and traction control on the vehicle wheels. An anti-lock control electromagnetic valve having opposed ends is disposed between the body portion and the adaptor portion, wherein the anti-lock control valve includes a first port supported by one of the ends of the anti-lock control valve, and a second port supported by the other end of the anti-lock control valve. A first receiving means formed in the master cylinder body portion removably receives the first port of the anti-lock control valve. A second receiving means formed in the adaptor portion removably receives the second port of the anti-lock control valve. Connecting means connects the hydraulic passages of the master cylinder assembly with the hydraulic passages of the distributor assembly when the master cylinder assembly and the distributor assembly are assembled. The apparatus further comprises a traction control valve removably disposed between the arm portion of the reservoir and an upper portion of the adaptor portion.

DESCRIPTION OF THE PREFERRED EMBODIMENT

Embodiments of the present invention will now be described in detail with reference to the drawings.

Figure 1:
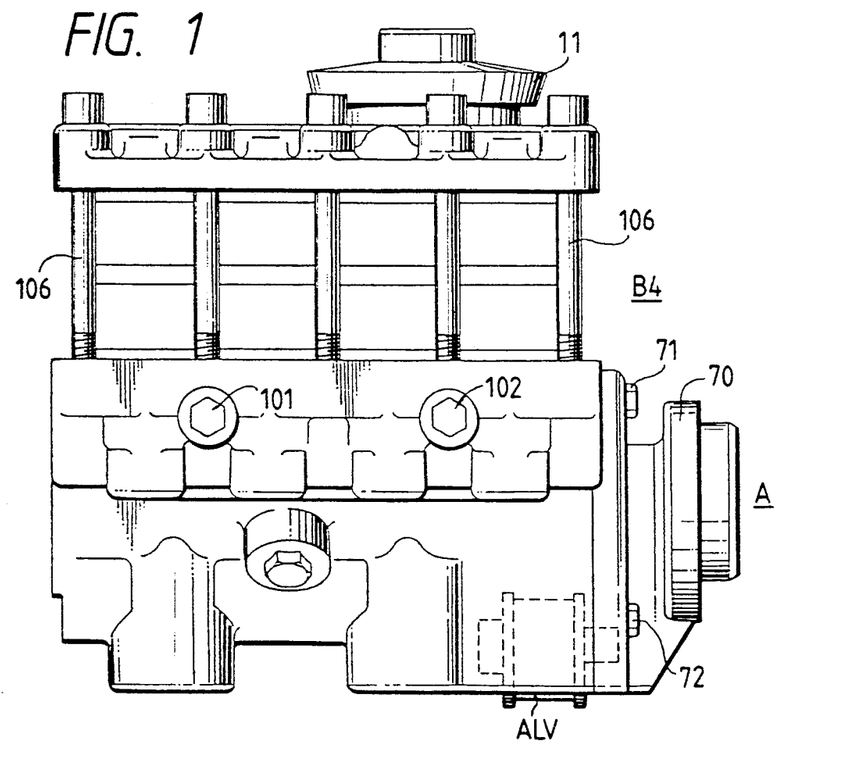
FIG. 1 is an embodiment of a front view of a brake hydraulic pressure control apparatus of the present invention.

FIG. 1 is a front view showing the general configuration of a brake hydraulic pressure control apparatus for anti-lock control according to an embodiment of the present invention. In the drawing, the apparatus comprises a master cylinder assembly A, and a four-channel control distributor assembly B4 removably attached to the master cylinder assembly A through two attachment bolts 101 and 102.

Figure 2:
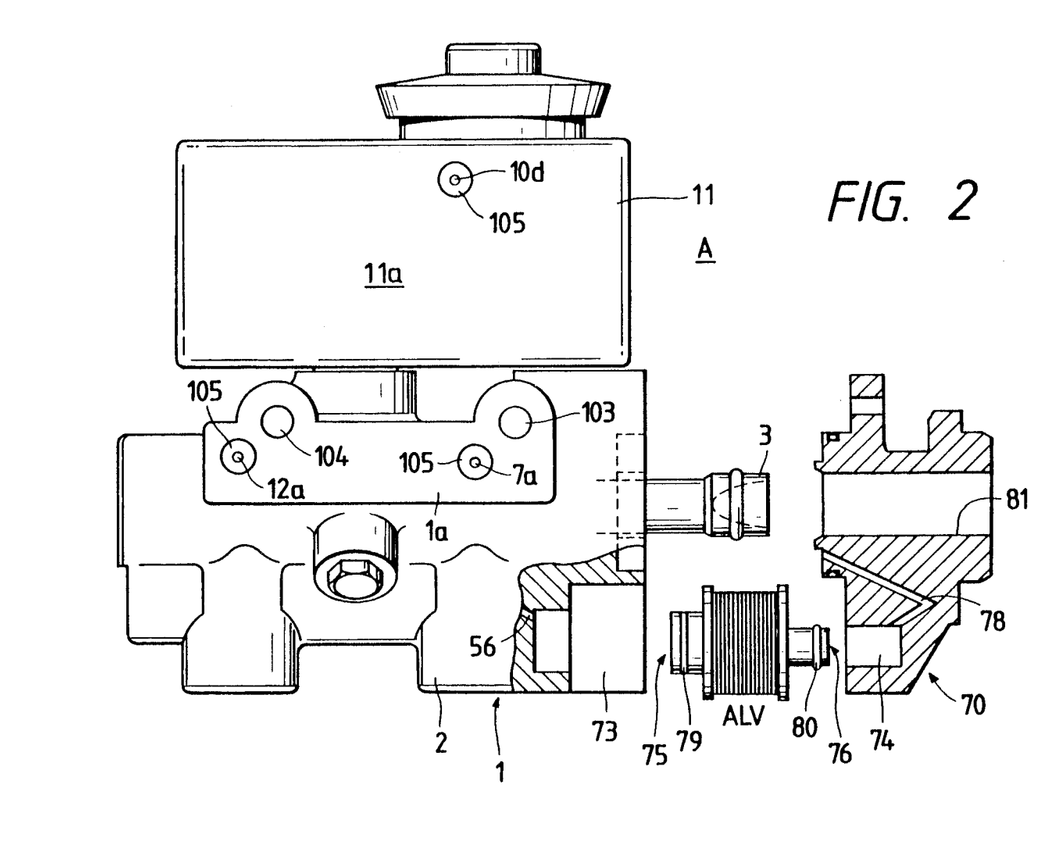
FIG. 2 is a front view of a master cylinder assembly of the present invention.

As shown in FIG. 2, the master cylinder assembly A is comprised of a master cylinder body 1, a booster fixing adapter 70 is fixed to one end of a housing 2 of the master cylinder body portion 1 by bolts 71 and 72. A reservoir 11 is fixed in the upper portion of housing 2 of the master cylinder body 1. The master cylinder body 1 has an attachment surface 1a for attaching the distributor assembly B4 thereon. The attachment surface 1a is provided with screw-holes 103 and 104 to receive the bolts 101 and 102. Inner hydraulic passages 7a and 12a are open at the surface 1a. The housing of reservoir 11 has also a flat attachment surface 11a at which an inner hydraulic passage 10d opens. The opening portions of the hydraulic passages 7a, 12a and 10d are respectively surrounded by seal members 105.

Cavities 73 and 74 for storing an anti-lock control of a normally opened type electromagnetic valve (hereinafter called "anti-lock valve") ALV which is closed only during anti-lock control, are respectively provided in the master cylinder body 1 and the adapter 70 so as to be arranged with a junction surface formed therebetween.

The anti-lock valve ALV is designed to have a two-port two-position changeover valve having ports 75 and 76 at opposite ends. The anti-lock valve is designed so as to be supported in between the master cylinder body 1 and the adapter 70, with the port 75 facing the master cylinder body 1 and the other port 76 facing the adapter 70. In short, the anti-lock valve ALV is designed to be fixed to the master cylinder assembly A as the adapter 70 is attached to the master cylinder body 1 through bolts 71, 72. Hydraulic passages 56 and 78 respectively leading into the cavities 73 and 74 are also provided in the master cylinder body 1 and the adapter 70, respectively.

Anti-lock valve ALV has sealing members 79 and 80 surrounding ports 75 and 76. When the anti-lock valve ALV is fixed to the master cylinder body 1 and adaptor 70, a fluidtight connection between the port 75 and the hydraulic passage 56 and a fluidtight connection between the port 76 and the hydraulic passage 78 can be attained. Further, the adapter 70 has a cylindrical hole 81 formed therein for receiving a part of a primary piston 3 which will be described later.

Figure 3:
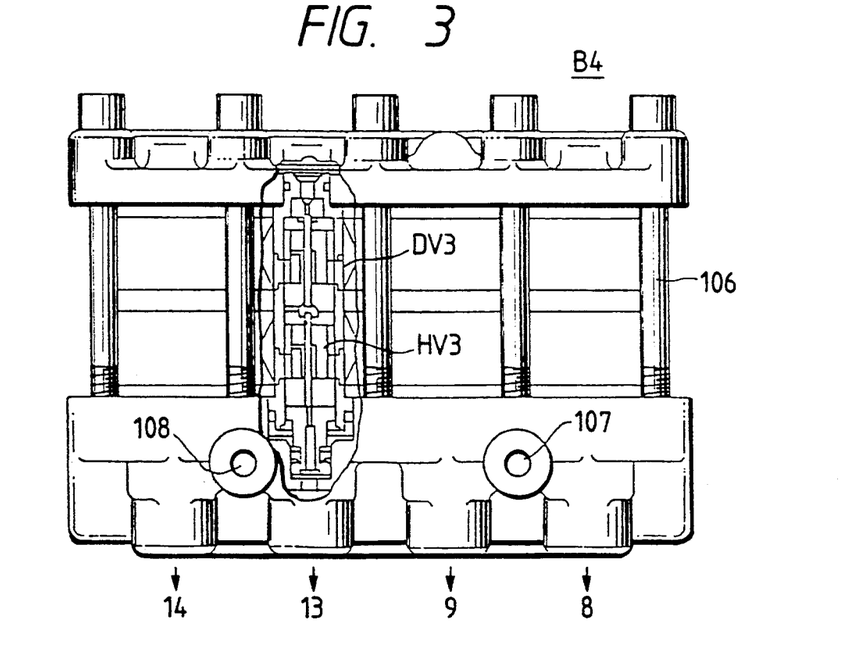
FIG. 3 is a partial cutaway front view of a distributor assembly of the present invention.

The distributor assembly B4 as shown in FIG. 3 has two bolt insertion holes 107 and 108 and contains four hold valves HV1 to HV2 and four decay valves DV1 to DV4. The distributor assembly B4 is assembled by ten of bolts 106. Three hydraulic passages to be respectively connected with hydraulic passages 7a, 12a and 10d the master cylinder assembly A are open at the attachment surface (not shown) of the distributor assembly B4 to communicate with the master cylinder assembly A. When the distributor assembly B4 is fixed to the master cylinder assembly A through the attachment bolts 101 and 102, the hydraulic passages in the distributor assembly B4 communicate with the hydraulic passages 7a, 12a and 10d in the master cylinder assembly A in a liquid tight.

Figure 4:
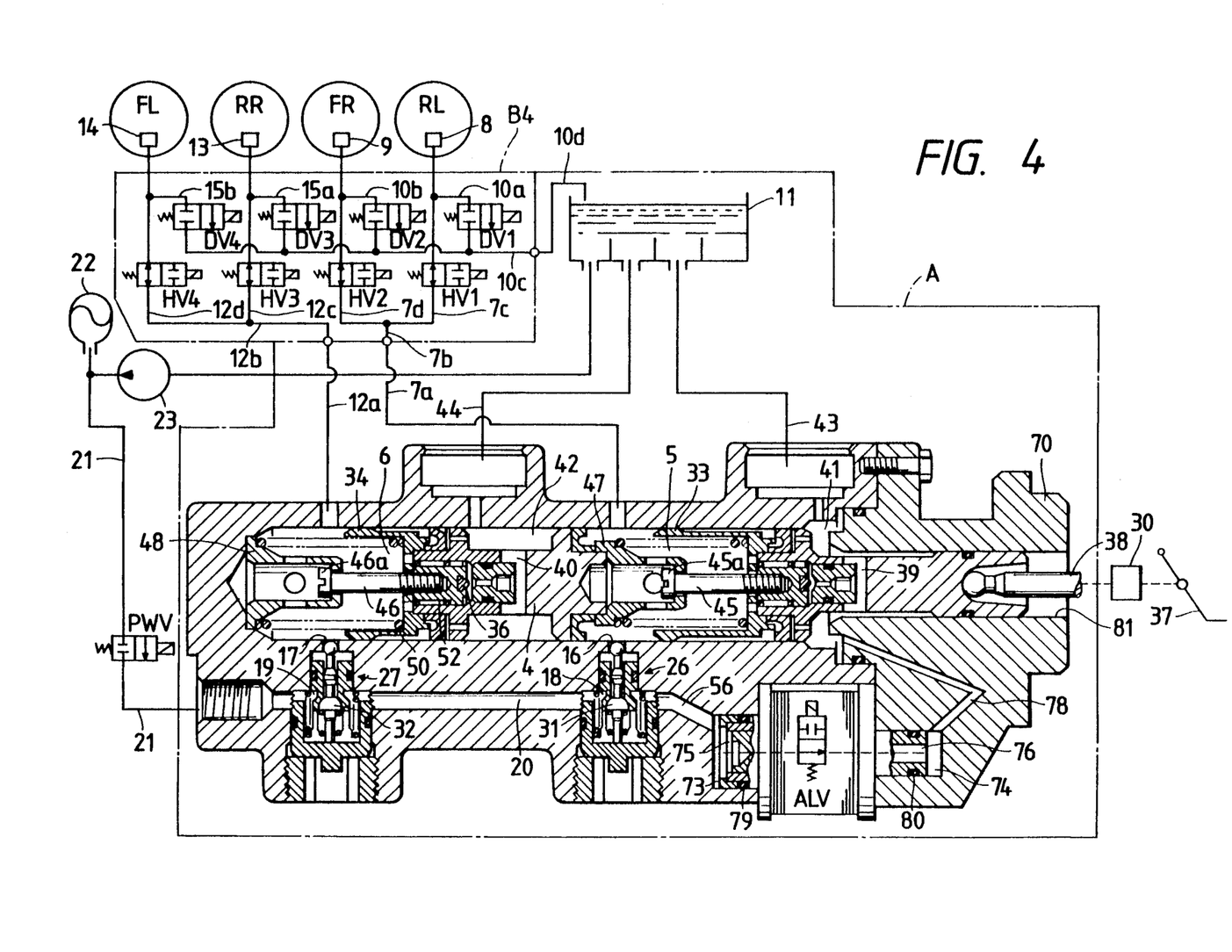
FIG. 4 is a cross-sectional view of the internal configuration of the brake hydraulic pressure control apparatus of FIG. 1.

FIG. 4 is a cross-sectional view of the inner configuration of the brake hydraulic pressure control apparatus depicted in FIGS. 1 and 2. In the drawing, the master cylinder assembly A and the distributor assembly B4 are shown in cross-section.

The tandem master cylinder body 1 forming the master cylinder assembly A has a primary piston 3 and a secondary piston 4 provided in its housing 2, and hydraulic pressure chambers 5 the pressures of which are controlled by the pistons 3 and 4 respectively.

A hydraulic passage 7a communicates with the hydraulic pressure chamber 5, the pressure of which is controlled by the primary piston 3, and the hydraulic passage 7a is connected to the hydraulic passage 7b in the distributor assembly B4. The hydraulic passage 7b is connected both to a wheel cylinder 8 of the rear left wheel RL and to a wheel cylinder 9 of the front right wheel FR through hydraulic passages 7c and 7d having hold valves HV1 and HV2, formed of a normally opened type electromagnetic valve. The wheel cylinders 8 and 9 are connected to a hydraulic passage 10c through hydraulic passages 10a and 10b having decay valves DV1 and DV2, constituted by normally closed electromagnetic valves. The hydraulic passage 10c communicates with the hydraulic passage 10d so that the wheel cylinders are connected with the reservoir 11 through the hydraulic passage 10d.

Similarly, a hydraulic passage 12a communicates with hydraulic pressure chamber 6, the pressure of which is controlled by the secondary piston 4, and the hydraulic passage 12a is connected to the hydraulic passage 12b in the distributor assembly B4. The hydraulic passage 12b is connected both to a wheel cylinder 13 of the rear right wheel RR and to a wheel cylinder 14 of the front left wheel FL through hydraulic passages 12c and 12d having hold valves HV3 and HV4, constituted by normally opened electromagnetic valves. The wheel cylinders 13 and 14 are connected to the hydraulic passage 10c through hydraulic passages 15a and 15b having decay valves DV3 and DV4 of a normally closed electromagnetic valves type, so that the wheel cylinders communicate with the reservoir 11 through the hydraulic passage 10d.

Valve chambers 18 and 19 having opening portions 16 and 17 which communicate with the hydraulic pressure chambers 5 and 6, respectively, are formed in the housing 2 of the master cylinder body 1. The valve chambers 18 and 19 are connected together through a hydraulic passage 20 formed in the housing 2. The valve chamber 19 is connected to an accumulator 22 through a hydraulic passage 21 having a supply valve PWV provided in the middle thereof and constituted by a normally closed electromagnetic valve. The accumulator 22 is connected to the output side of a hydraulic pressure pump 23 while the suction side is connected to the reservoir 11. As will be described later, valve mechanisms 26 and 27 respectively having intake valves 31 and 32 serving as check valves, are provided in the valve chambers 18 and 19, respectively.

Cylindrical intake sleeves 33 and 34 for operating the intake valves 31 and 32 are fixed to the primary and secondary pistons 3 and 4 and face the hydraulic pressure chambers 5 and 6, respectively. Primary and secondary pistons 3 and 4 contain center valves 35 and 36 which are movable along the axis of the master cylinder 1, relative to pistons 3 and 4. In the case where a brake pedal 37 is not yet pushed and a push rod 38 connected to the brake pedal 37 through a booster 30 does not yet press the primary piston 3 as shown in FIG. 4, the hydraulic chambers 5 and 6 communicate with the reservoir 11 through center valves 35 located in their open positions, passages 39 and 40 in the pistons 3 and 4, annular chambers 41 and 42 formed around the pistons 3 and 4, and hydraulic passages 43 and 44, respectively. When the brake pedal 37 is pushed to operate the push rod 38 to move the primary piston 3 to the left as shown in FIG. 4, the center valve 35 is moved to its closed position to cut off hydraulic pressure chamber 5 from the reservoir 11. Accordingly, the hydraulic pressure in the hydraulic chamber 5 increases, so that brake fluid in the hydraulic chamber 5 is supplied to the wheel cylinders 8 and 9 through the open-state hold valves HV1 and HV2, to control the wheels RL and FR. Further, the secondary piston 4 is operated by the increase of hydraulic pressure in the hydraulic pressure chamber 5 to move the center valve 36 to its closed position, so that the hydraulic pressure chamber 6 is cut off from the reservoir 11. Accordingly, hydraulic pressure in the hydraulic pressure chamber 6 also increases, so that brake fluid in the hydraulic pressure chamber 6 is supplied to wheel cylinders 13 and 14 through the open-state hold valves HV3 and HV4 to control braking of the wheels RR and FL.

The aforementioned positional relationships and operations of the respective members are attained by stop bolts 45 and 46 having the center valves 35 and 36 at one end portion, stop bushings 47 and 48 engaged with heads 45a and 46a provided at the opposite end portions of the stop bolts 45 and 46, contracted springs 49 and 50 provided between the stop bushings 47 and 48 and the intake sleeves 33 and 34, and springs 51 and 52 for urging the center valves 35 and 36 toward their closed positions.

An annular chamber 41 formed between the housing 2 of the master cylinder body 1 and the primary piston 3 is connected with the reservoir 11 through the hydraulic passage 43 communicating with the valve chamber 18 through the hydraulic passage 78 located in adapter 70 and the hydraulic passage 56 located in the housing 2 when the anti-lock valve ALV is open. Accordingly, the pressure in the valve chambers 18 and 19 equals atmospheric pressure at all times except during anti-lock control, so that no hydraulic pressure remains in the valve chambers 18 and 19 expect during anti-lock control.

Figure 5:
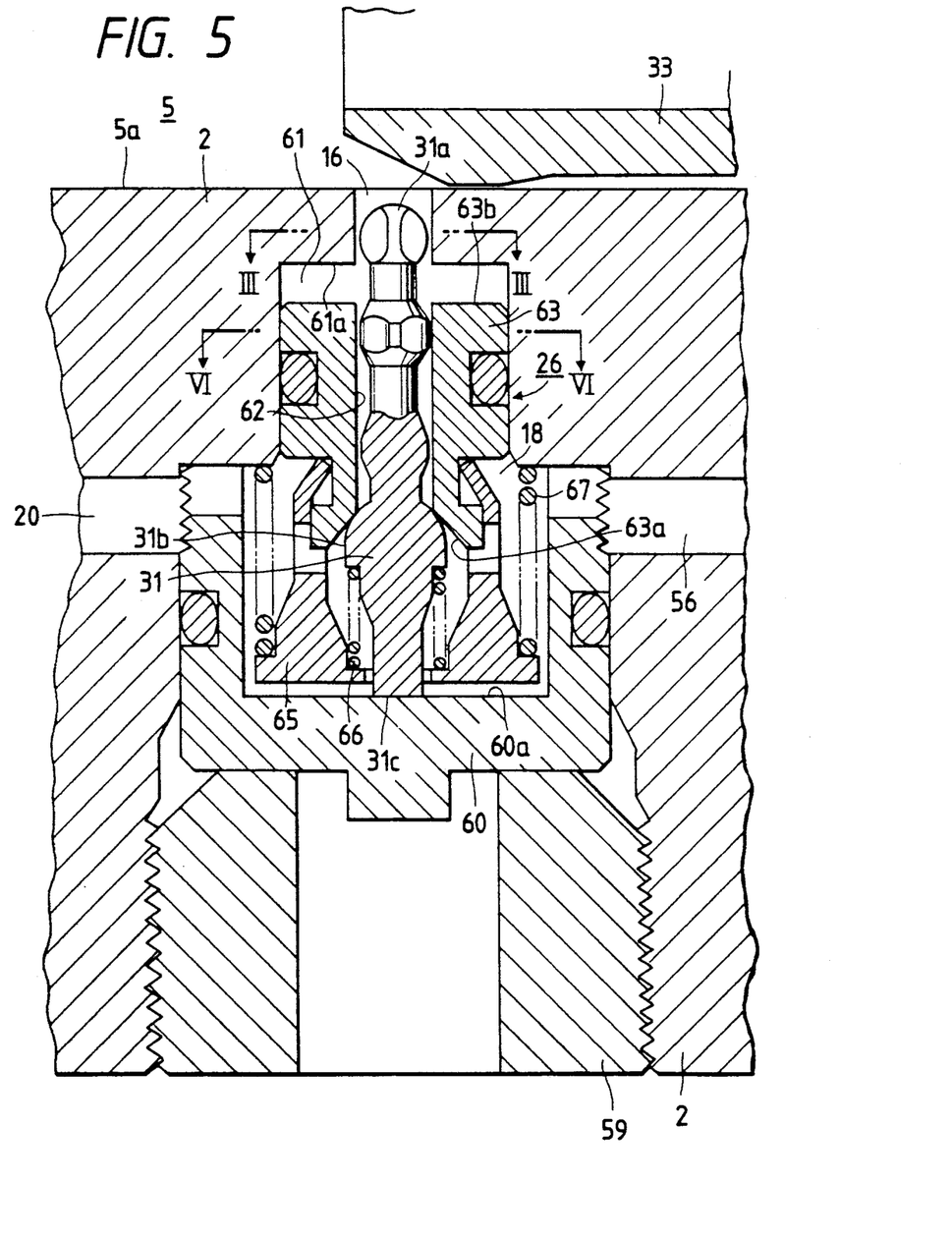
FIG. 5 is an enlarged cross-sectional view of the valve mechanisms of FIG. 5.

FIG. 5 is an enlarged cross-sectional view showing an example of the configuration of the valve mechanism 26, identical to valve mechanism 27 in which the valve chamber 18 is constituted by a cup-shaped plug 60 fixed to the housing 2 by a set screw 59. A piston chamber 61 is formed adjacent to the opening portion 16 of the valve chamber 18 and opens into the hydraulic pressure chamber 5 so as to be coaxial with the opening portion 16. A piston 63 having a center hole 62 formed axially therethrough and serving as a valve holding member is provided so as to be slidable in the direction perpendicular to the inner circumferential surface 5a of the hydraulic pressure chamber 5, so as to have an axis in accordance with the axis of the opening portion. A conical valve seat surface 63a is formed at an end portion (opposite side to the opening portion 16) of the center hole 62 of the piston 63.

The intake valve 31 is constituted by a rod-like poppet valve piercing both the opening portion 16 of the housing 2 and the center hole 62 of the piston 63. The forward end portion 31a moves in and out of hydraulic pressure chamber 5 as the valve 31 moves. The intake valve 31 has a semispherical valve portion 31b seated on the valve seat surface 63a of the piston 63. The forward end portion 31a and the shaft portion of the intake valve 31 partly have a substantially tetragonal cross-section whose four corners slidably contact the inner circumferential surface of the opening portion 16 of the housing 2 and the inner circumferential surface of the center hole 62 of the piston 63 to prevent the intake valve 31 from becoming entangled when the intake valve is pressed down by the intake sleeve 33. Therefore, the operation of the intake valve can be smooth and at the same time, a hydraulic passage can be formed around the outer circumferential surface of the intake valve 31.

A spring holder 65 is integrally combined with the piston 63. A contracted check spring 66 is disposed in between the spring holder 65 and the intake valve 31, so that the valve portion 31a of the intake valve 31 is urged by a predetermined check pressure of the spring, so as to sit on the valve seat surface 63a of the piston 63. Further, the piston 63 is biased so as to be distant from the opening portion 16 by a contracted set spring 67 disposed between the spring holder 65 and a wall surface of the valve chamber 18. The biasing force of the set spring 67 is designed to be greater than the face of the check spring 66, so that the piston 63 is kept in a state as shown in FIG. 5 by the biasing force of the set spring 67 when the base end surface 31a of the intake valve 31 comes into contact with the inner wall surface 60a of the plug 60. The biasing force of the set spring 67 also acts between the valve seat surface 63a of the piston 63 and the valve portion 31b of the intake valve 31.

In short, at all times except during anti-lock control, as is obvious from FIG. 4, the supply valve PWV is closed and the anti-lock valve ALV is opened. Accordingly, no hydraulic pressure acts on the valve chamber 18, so that the end surface 63b of the piston 63 is disengaged from the wall surface 61a of the piston chamber 61, so that the forward end portion 31a of the intake valve 31 projects into the opening portion 16. When the primary piston 3 is then moved leftward by pushing the brake pedal 37 to increase the hydraulic pressure in the hydraulic pressure chamber 5, the valve seat surface 63a of the piston 63 is further pressed on to the valve portion 31b of the intake valve 31 by the hydraulic pressure applied to the other end surface 63b of the piston 63, improving the sealing properties of the valve portion 31b.

Figure 6:
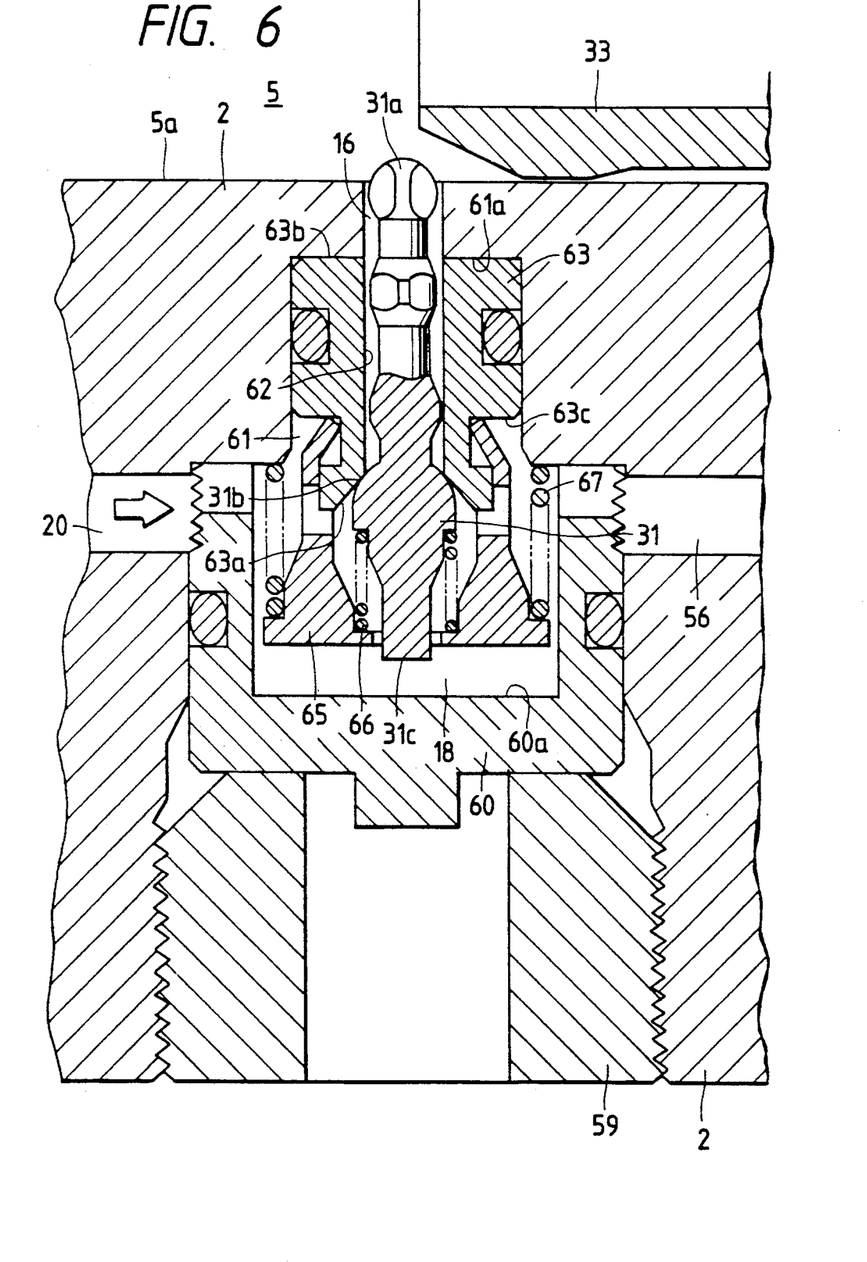
FIGS. 6 and 7 are cross-sectional views explaining the operation of the valve mechanisms.

FIG. 6 shows a condition of the valve mechanism 26 in the case where anti-lock control is started so that the supply valve PWV and the anti-lock valve ALV are respectively opened and closed to cut off the hydraulic passage leading to reservoir 11. In this case, high-pressure brake fluid from the accumulator 22 flows into valve chamber 18 through the hydraulic passages 21 and 20, so that the hydraulic pressure is applied to the end surface 63c of the piston 63 opposite to the end surface 63b thereof. Accordingly, piston 63 is moved toward the opening portion 16 against the biasing force of the set spring 67 while the intake valve 31 is held against valve seat surface 63a by the biasing force of the check spring 66. Consequently, the end portion 63b of the piston 63 contacts the wall surface 61a of the piston 61 and stops. In this condition, the forward end portion 31a of the intake valve 31 projects into the hydraulic pressure chamber 5.

Figure 7:
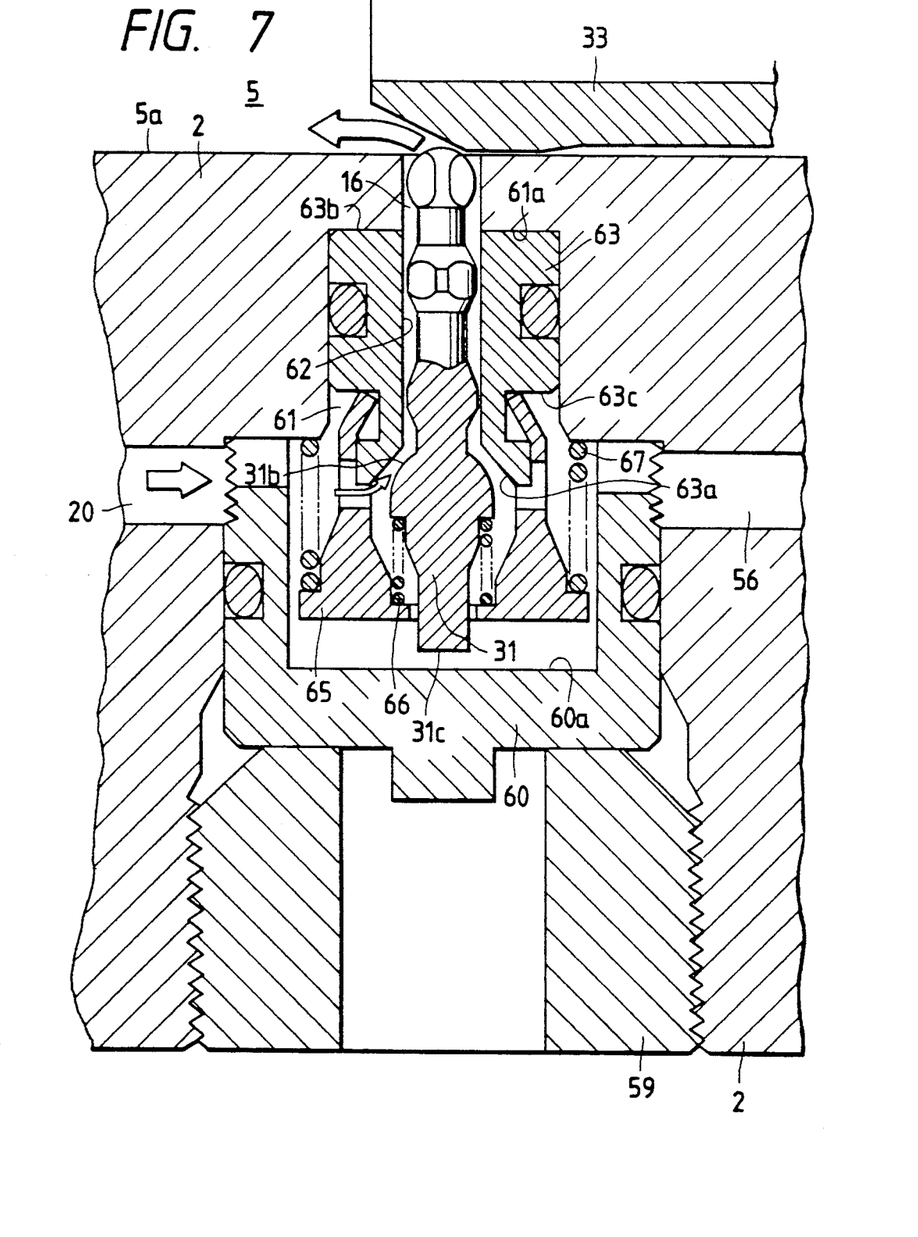

Accordingly, when the primary piston 3 moves to the left, as shown in FIG. 1, the intake sleeve 33 engages the forward end portion 31a of the intake valve 31 as shown in FIG. 7 to press the intake valve 31 downward against the biasing force of the check spring 66. When this occurs valve portion 31b is disengaged from the valve seat surface 63a of the piston 63 and, accordingly, high-pressure brake fluid from accumulator 22 is supplied to hydraulic pressure chamber 5.

In the following, the operation of the brake hydraulic pressure control apparatus depicted in FIG. 4 is described with reference to FIG. 8.

Figure 8:
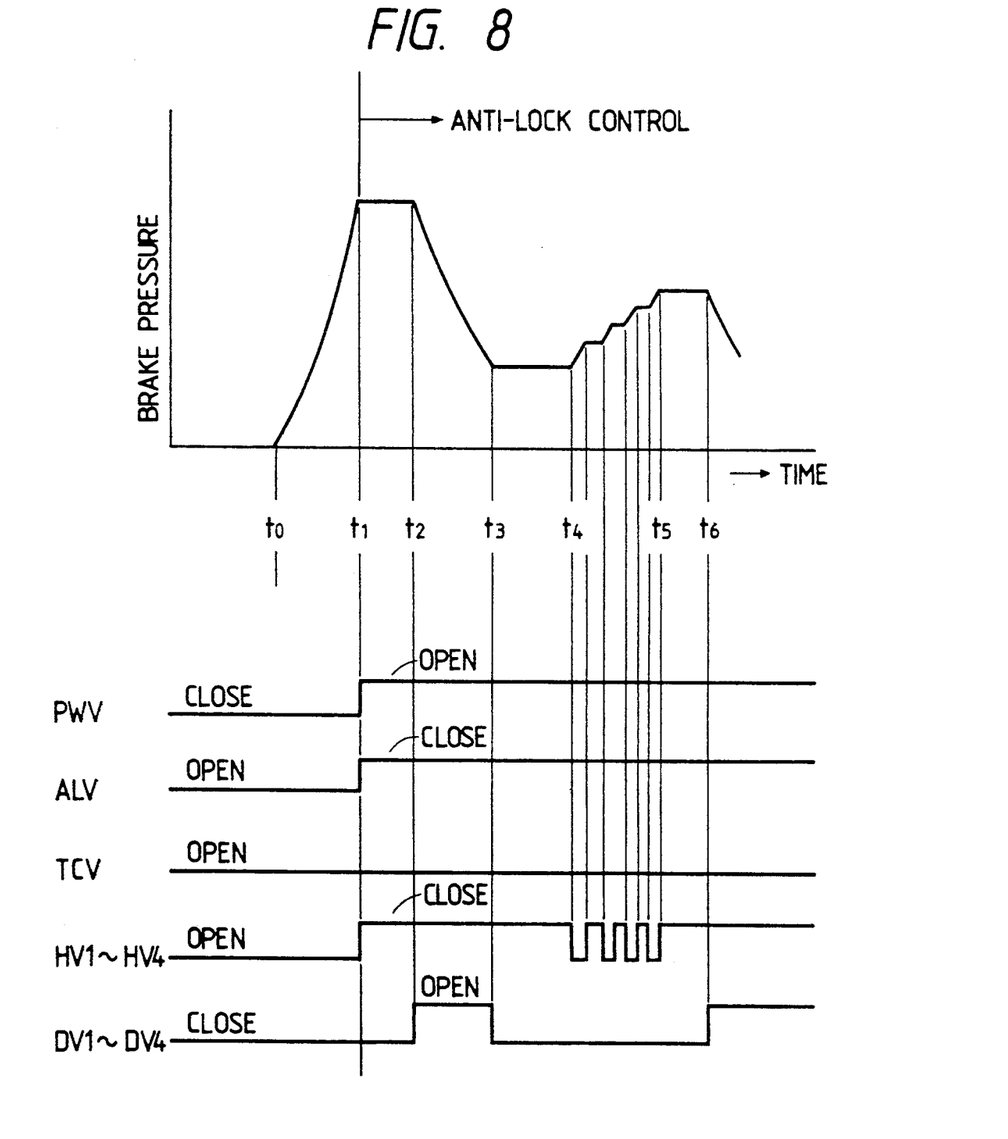
FIG. 8 is a time chart showing anti-lock control effected by the apparatus of FIG. 4.

FIG. 8 is a time chart showing the state of the changing of the brake hydraulic pressure during ordinary braking control and during anti-lock control following the ordinary control in combination with the respective states of opening and/or closing of the supply valve PWV, anti-lock valve ALV, traction control valve TCV, hold valves HV1 to HV4 and decay valves DV1 to DV4. Although hydraulic pressures in the four braking systems are, in practice, controlled separately, the following description is simplified by the assumption that all the systems are operated simultaneously.

(A) In Ordinary Braking Control ($t_0$ to $t_1 1$ in FIG. 8)

By depressing the brake pedal 37 supply valve PWV is closed (OFF), anti-lock valve ALV is opened (OFF), hold valves HV1 to HV4 are opened (OFF) and delay valves DV1 to DV4 are closed (OFF) as shown in FIG. 4. Primary piston 3 is pressed by the push rod 38 and moved leftward as shown in FIG. 4 to close the center valve 35 and, at the same time, the secondary piston 4 is also moved to the left to close the center valve 36. In this case, the valve mechanisms 26 and 27 are in the states shown in FIG. 5, so that hydraulic pressure is produced in the hydraulic pressure chambers 5 and 6 and supplied to the wheel cylinders 8, 9, 13 and 14 to perform braking control of the wheels.

(B) In Anti-lock Control

When speed deceleration exceeding a predetermined value of wheel speed is detected through the increase of the hydraulic pressure in the wheel cylinders, a hold signal is generated from a control circuit (not shown) configured by a micro-computer so that anti-lock control is started at time $t_1$.

(1) Hold Mode ($t_1$ to $t_2$ in FIG. 8)

At time $t_1$ (FIG. 8), the supply valve PWV is open (turned ON), the anti-lock valve ALV is closed (turned OFF) and the hold valves HV1 to HV4 are closed (turned ON) to cut off the hydraulic passages 7c and 7d communicating with wheel cylinders 8 and 9 and the hydraulic passages 12c and 12d communicating with wheel cylinders 13 and 14, so that the hydraulic pressures in the wheel cylinders 8, 9, 13 and 14 are maintained. In this case, the valve mechanisms 26 and 27 are in the states shown in FIG. 6, so that the forward end portions 31a and 32a of the intake valves 31 and 32 project into the hydraulic pressure chambers 5 and 6, respectively. If the intake sleeves 33 and 34 are in positions where the intake valves 31 and 32 can be pressed downward by the intake sleeves, the valve mechanisms 26 and 27 are in the states shown in FIG. 7, so that high-pressure brake fluid from the accumulator 22 flows into the hydraulic pressure chambers 5 and 6 through the hydraulic passages 21 and 201

Due to the brake hydraulic pressure, the pistons 3 and 4 are moved back to positions where the intake sleeves 33 and 34 are disengaged from the intake valves 31 and 32, so that the hydraulic pressure in the hydraulic pressure chambers 5 and 6 becomes proportional to the force of depressing the brake pedal 37. In this case, the intake sleeves 33 and 34 press the intake valves upward corresponding to the positions of the primary and secondary pistons 3 and 4, so that the hydraulic pressure chambers 5 and 6 are connected to the accumulator 22. As a result, the pistons 3 and 4 are moved back by the hydraulic pressure led from the accumulator 22 until the intake valves 31 and 32 close the opening portions 16 and 17. Accordingly, sufficient hydraulic pressure can be maintained in the hydraulic pressure chambers 5 and 6, even if a failure occurs in the hydraulic pressure source systems.

(2) Pressure Reducing Mode ($t_2$ to $t_3$ in FIG. 8)

When the wheel speed is further reduced, the decay valves DV1 to DV4 are opened (turned ON) at time $t_2$, so that brake fluids in the wheel cylinders 8, 9, 13 and 14 flow into the reservoir 11 through the hydraulic passages 10a, 10b, 15a and 15b. Accordingly, hydraulic pressure from the brake fluids in the wheel cylinders is reduced.

(3) Hold Mode ($t_3$ to $t_4$ in FIG. 8)

At time $t_3$ when the wheel speed is recovered from its low peak by the pressure reduction of the brake hydraulic pressures, the decay valves DV1 to DV4 are closed (turned OFF), so that the apparatus is returned to the hold mode again.

(4) Pressurization Mode ($t_4$ to $t_5$ in FIG. 8)

When the wheel speed reaches its high peak, the hold valves HV1 to HV4 are opened (turned OFF), so that the pistons 3 and 4 move to open the intake valves 31 and 32 to supply the hydraulic pressure from the accumulator 22 to the wheel cylinders 8, 9, 13 and 14 through the hydraulic pressure chambers 5 and 6. In the pressurization mode which is started at time $t_4$ (FIG. 8), the brake hydraulic pressures are increased stepwise by quickly turning hold valves HV1 to HV4 ON and OFF.

(5) Hold Mode ($t_5$ to $t_6$ in FIG. 8)

When the reduction of the wheel speed begins by the pressurization of the brake hydraulic pressures, the apparatus is returned to the hold mode, so that the hold valves HV1 to HV4 are closed (turned OFF). At time $t_6$, the decay valves DV1 to DV4 are opened (turned ON), so that the apparatus is returned to the pressure reducing mode.

The configuration and operation of the first embodiment according to the present invention has become apparent from above description. In this embodiment, the master cylinder assembly A is separated into master cylinder body 1 and booster fixing adapter 70 so that the anti-lock valve ALV can be supported therebetween. Accordingly, it is not necessary to provide any special anti-lock valve ALV fixing means. Further, fixing of the anti-lock valve ALV to the master cylinder assembly A and connection between the two ports 75 and 76 of the anti-lock valve ALV and the hydraulic passages 56 and 78 can be attained at the same time as the adapter 70 is attached to the master cylinder body 1. Accordingly, the attachment of the anti-lock valve ALV can be made done very easily.

Further, in this embodiment, the forward end portions 31a and 32a of the intake valves 31 and 32 of the master cylinder body 1 are designed so as not to project into the hydraulic pressure chambers 5 and 6 during ordinary control, but will project into the hydraulic pressure chambers 5 and 6 during anti-lock and traction control, to engage with the intake sleeves 33 and 34. Accordingly, the durability of the intake valves 31 and 32 is improved. Further, the piston 63 is pressed downward by the hydraulic pressure of the hydraulic pressure chambers 5 and 6 during ordinary control so that the hydraulic pressure acts as pressing force between the valve seat surface 63a of the piston 63 and the valve portion 31b of the intake valve 31. Accordingly, the sealing properties of the valve portion 31b during ordinary control are very good.

Furthermore, in this embodiment, sealing portions at the hydraulic pressure chambers 5 and 6 and a sealing portions at accumulator 22 are formed in the hydraulic passages 20 and 21 connected between accumulator 22 and the hydraulic pressure chambers 5 and 6 by the valve portions of the intake valves 31 and 32 and the valve seat surfaces of the pistons. Accordingly, the sealing portions are highly reliable.

Although this embodiment has demonstrated a distributor assembly B4 having four hold valves HV1 to HV4 and four decay valves DV1 to DV4 for the purpose of four-channel control, the distributor assembly B4 is removable from the master cylinder body 1 so that another distributor assembly having, for example, three hold valves and three decay valves can be interchangeably attached to the master cylinder assembly B4 to provide a three-channel anti-lock control apparatus or a further distributor assembly having two hold valves and two decay valves can be interchangeably attached to the master cylinder assembly to provide a two-channel anti-lock control apparatus.

As described above, the first embodiment according to the present invention relates to an anti-lock control for a hydraulic pressure control apparatus for preventing wheels from locking during braking. In the following second embodiment, an apparatus for preventing the slipping of driving wheels during starting or accelerating of a vehicle to facilitate traction control to improve the starting properties, accelerating properties and running stability of the vehicle is described.

Figure 9:
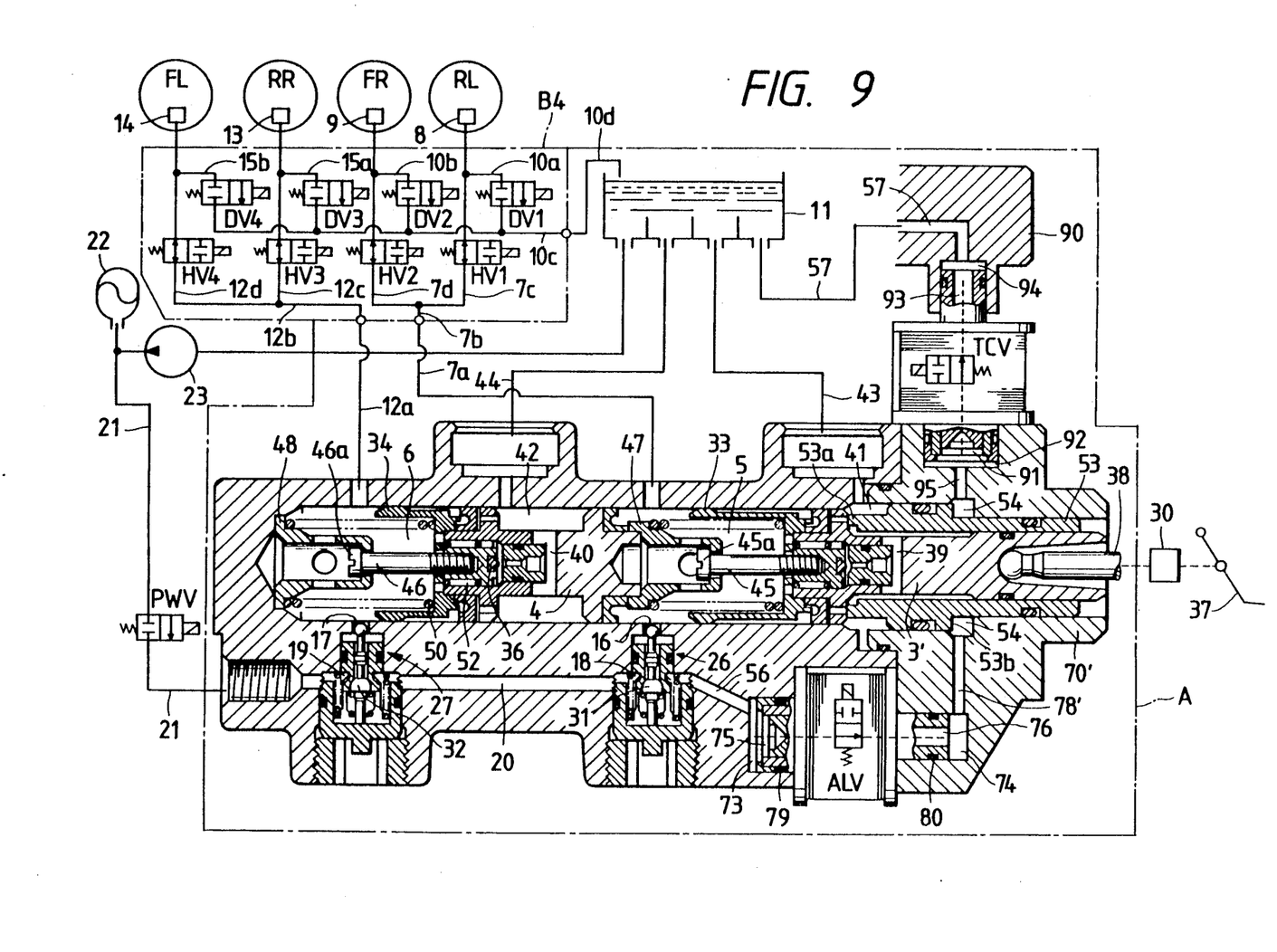
FIG. 9 is a cross-sectional view of the brake hydraulic pressure control apparatus for anti-lock and traction control according to a second embodiment of the present invention.

The second embodiment of the invention is described hereunder with reference to FIG. 9, in which the respective configurations of the master cylinder body 1, the anti-lock valve and the distributor assembly B4 are the same as those in the first embodiment. Like parts in the first and second embodiments are referenced correspondingly, while parts which differ slightly in configuration from those in the first embodiment are represented by the same reference numerals with a dash put thereafter, so to avoid duplicate description. Description will be made in reference only to different constituent parts and the traction controlling operation.

In this embodiment, as is obvious from FIG. 9, a traction control sleeve-shaped auxiliary piston 53 is provided in the booster fixing adapter 70' removably attached to the master cylinder body 1. The auxiliary piston 53 is coaxial slidable with respect to primary piston 3'. A projection 53a at the forward end of the auxiliary piston contacts primary piston 3'. The auxiliary piston 53 has an annularly shaped pressure-receiving stepped portion 53b facing to the right (FIG. 9). An auxiliary hydraulic pressure chamber 54 is formed to the right of the stepping portion 53b. The auxiliary hydraulic pressure chamber 54 communicates with the valve chamber 18 via a hydraulic passage 78' formed in the adapter 70', and the anti-lock valve ALV communicates with hydraulic passage 56, when the anti-lock valve ALV is open. Accordingly, pressurized brake fluid from the accumulator 22 is supplied to the auxiliary hydraulic pressure chamber 54 through hydraulic passage 21 having a supply valve PWV and hydraulic passage 20 connecting the valve chambers 18 and 19 to each other.

A traction control valve TCV constituted by a normally opened two-port electromagnetic valve, which is closed only during traction control is supported by the upper portion of the adapter 70'. The traction control valve TCV has the same structure as that of the anti-lock valve ALV, and is supported in between an arm portion 90 extending from the housing of the reservoir 11 and the adapter 70'. A cavity 92 for accommodating one port 91 of the traction control valve TCV is formed in the upper surface of the adapter 70'. A cavity 94 for accommodating the other port 93 of the traction control valve TCV is formed in the arm portion 90 above the cavity 92. The cavity 92 of the adapter 70' communicates with the auxiliary hydraulic pressure chamber 54 through hydraulic passage 95. Cavity 94 of the arm portion 90 communicates with the reservoir 11 through hydraulic passage 57. When the reservoir 11 is attached to the master cylinder body 1 having the adapter 70' beforehand fixed, the traction control valve TCV is fixed between the adapter 70' and the arm portion 90, and at the same time, airtight connections between the port 91 and the hydraulic passage 95, and between the port 93 and the passage 57 are attained.

As described above, the normally opened anti-lock valve ALV which is closed only during anti-lock control, to thereby block the hydraulic passage leading from the valve chambers 18 and 19 into the reservoir 11 via the auxiliary hydraulic pressure chamber 54 is provided in the hydraulic passage 56 connected to the auxiliary hydraulic pressure chamber 54. Further, the hydraulic passage 56 communicates with hydraulic passages 21 and 20 connected between the accumulator 22 and the hydraulic pressure chambers 5 and 6. Furthermore, the auxiliary hydraulic pressure chamber 54 is connected to the reservoir 11 through the hydraulic passage 57 containing the normally opened traction control valve TCV which is closed only during traction control. Accordingly, the pressure in the valve chambers 18 and 19 and the auxiliary hydraulic pressure chamber 54 equals atmospheric pressure at all times except during anti-lock control and during traction control, so that no hydraulic pressure remains in the hydraulic passages leading from the supply valve PWV to the traction control valve TCV via the anti-lock valve ALV at all times except during anti-lock and traction control.

While the configuration of the brake hydraulic pressure control apparatus of the second embodiment of the invention has been described, it is a matter of course that the same function as that of the apparatus of FIG. 4 can be attained by closing the anti-lock valve ALV at the time of anti-lock control.

In the following, the operation of the brake hydraulic pressure control apparatus of FIG. 9 at the time of traction control is described with reference to FIG. 10.

In the case of traction control for preventing the slipping of the driving wheels FR and FL during starting or accelerating of the vehicle, the mode of the control circuit, (not shown) configured by a micro-computer, is turned to a pressurization mode at time $t_{11}$ (FIG. 10) when the slipping of the driving wheels RL and RR is detected.

(1) Pressurization Mode ($t_{11}$ to $t_{12}$)

At time $t_{11}$ (FIG. 10), the hold valves HV2 and HV4 and the traction control valve TCV are closed (turned ON). Accordingly, both the connection between the wheel cylinders 9 and 14 of the follower wheels FR and FL and the hydraulicpressure chambers (main hydraulic pressure chambers) 5 and 6 of the master cylinder 1, and the connection between the auxiliary hydraulic pressure chamber 54 and the reservoir 11 are interrupted. At this time, the anti-lock valve ALV is opened (OFF), so that the auxiliary hydraulic pressure chamber 54 communicates with accumulator 22 to increase the pressure in the auxiliary hydraulic pressure chamber 54 to move the auxiliary piston 53 to the left in FIG. 5. At this time, the primary piston 3 is pressed by the auxiliary piston 53 and moved to the left to increase the brake hydraulic pressures in the wheel cylinders 8 and 13, so that the apparatus is turned to the pressurization mode.

During a predetermined period $\Delta T$ after traction control begins at time $t_{11}$, the hold valves HV1 and HV3 are opened (OFF) so that preliminary pressurization is carried out during the period. Thereafter, the hold valves HV1 and HV3 are closed (turned ON) so that the brake hydraulic pressures are maintained. Thereafter, brake hydraulic pressures are increased stepwise by quickly turning the hold valves HV1 and HV3 ON and OFF.

Figure 10:
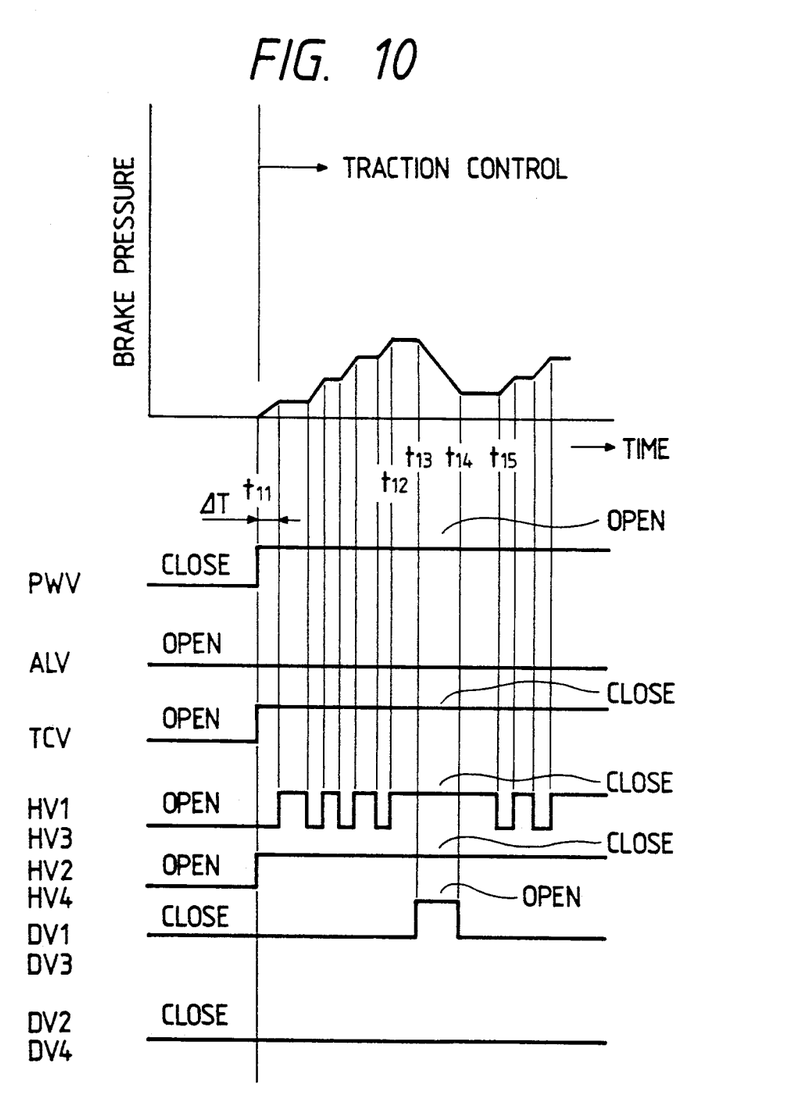
FIG. 10 is a time chart for explaining traction control effected by the apparatus of FIG. 9.

(2) Hold Mode ($t_{12}$ to $t_{13}$ in FIG. 10)

At time $t_{12}$ when the slipping of the driving wheels RL and RR is reduced, hold valves HV1 and HV3 are closed (turned ON) so that the apparatus is in the hold mode.

(3) Pressure Reducing Mode ($t_{13}$ to $t_{14}$ in FIG. 10)

Decay valves DV1 and DV3 are closed (turned On) at time $t_{13}$ so that the apparatus is turned to the pressure reducing mode. Thereafter, respective modes are repeated in the same manner as described above in anti-lock control.

In this case, hydraulic pressure in the auxiliary hydraulic pressure chamber 54, equal to the hydraulic pressure accumulated in the accumulator 22, is received by the auxiliary piston 53 at its annular pressure-receiving stepping portion 53b. Further, hydraulic pressure in the hydraulic pressure chamber 5 is applied onto an area of the primary piston 3 substantially equal to the sectional area of the hydraulic pressure chamber 5. Accordingly, the hydraulic pressure $P_M$ in the hydraulic pressure chamber when the intake valve 31 is closed is represented by the equation:

$$P_M = (A_B/A_M)P_A$$

in which $A_M$ is an area where the piston 3 receives pressure; $A_B$ is an area where the auxiliary piston 53 receives pressure; and $P_A$ is hydraulic pressure of the accumulator 22.

In short, the hydraulic pressure $P_M$ within the hydraulic pressure chamber 5 can be established by the ratio of the pressure-receiving areas $A_B/A_M$. If this ratio is set to be less than 1, the maximum hydraulic pressure applied to the wheel cylinders 8 and 13 is less than the hydraulic pressure $P_A$ of the accumulator 22, which prevents vibrations caused by the traction control from occurring, thereby enabling smooth traction control and preventing a large load from being applied on the driving system.

In addition to the effect of the first embodiment, the second embodiment has an effect in that maximum hydraulic pressure at the time of traction control can be selected through the interchanging adapter 70' and the auxiliary piston 53, because the piston 53 is stored in the booster fixing adapter 70' detachable from the master cylinder body 1. In short, maximum hydraulic pressure can be selected easily through adjustment of the rate of the external diameter to the internal diameter of the annular pressure-receiving stepping portion 53b of the auxiliary piston 53 and accordingly, through adjusting the area $A_M$ of the auxiliary piston where pressure is received.

What is claimed is:

1. A brake hydraulic pressure control apparatus providing anti-lock control for preventing the locking of vehicle wheels during braking and providing traction control to prevent slipping of the vehicle wheels during starting or accelerating of the vehicle, the apparatus comprising:

a master cylinder assembly including a body portion, an adaptor portion removably attached to an end of said body portion and a reservoir;

a hydraulic passage disposed within said adaptor portion;

hydraulic passages disposed within said master cylinder assembly;

a distributor assembly removably attached to said master cylinder assembly, said distributor assembly including a predetermined number of control channel means for controlling the vehicle wheels, a predetermined number of hydraulic passages, and a predetermined number of electromagnetic valves corresponding to the predetermined number of control channel means, said electromagnetic valves being disposed in said hydraulic passages for performing said anti-lock and traction control on said vehicle wheels;

an anti-lock control electromagnetic valve having opposed ends and being disposed between said body portion and said adaptor portion, wherein said anti-lock control valve includes a first port supported by one of said ends of said anti-lock control valve, and a second port supported by said other end of said anti-lock control valve;

first receiving means formed in said master cylinder body portion for removably receiving said first port of said anti-lock control valve;

second receiving means formed in said adaptor portion for removably receiving said second port of said anti-lock control valve; and connecting means for connecting the hydraulic passages of said master cylinder assembly with said hydraulic passages of said distributor assembly when said master cylinder assembly and said distributor assembly are assembled.

2. The apparatus of claim 1 wherein said master cylinder assembly further comprises a primary piston disposed in a first hydraulic pressure chamber of said body portion, a secondary piston disposed in a second hydraulic pressure chamber of said body portion, and first and second valve mechanisms communicating with said first and second hydraulic pressure chambers through opening portions in said body portion.

3. The apparatus of claim 2 wherein said master cylinder assembly further comprises an accumulator for producing hydraulic pressure and a reservoir fixed in an upper portion of said master cylinder body.

4. The apparatus of claim 3 wherein some of said predetermined number of hydraulic passages of said distributor assembly connect said predetermined number of control channels with said first and second hydraulic pressure chambers and some of said predetermined number of hydraulic passages connect said predetermined number of control channels with said reservoir.

5. The apparatus of claim 4 wherein said electromagnetic valves of said distributor assembly comprise hold valves disposed in said predetermined number of hydraulic passages of said distributor assembly connecting said predetermined number of control channels with said first and second hydraulic pressure chambers, and decay valves disposed in said predetermined number of hydraulic passages connecting said predetermined number of control channels with said reservoir.

6. The apparatus of claim 3 wherein each of said valve mechanisms comprises an intake valve disposed in a valve chamber of said master cylinder body, said intake valve having an end portion which extends through one of said opening portions of said master cylinder body into one of said first or second hydraulic pressure chambers, a piston coaxial with and partly surrounding said intake valve, and a plurality of hydraulic passages.

7. The apparatus of claim 6 wherein a supply valve is located in said hydraulic passage between said accumulator and said second valve mechanism.

8. The apparatus of claim 6 wherein one of said hydraulic passages of said valve mechanisms connects said accumulator with said valve chamber of said second valve mechanism, another of said hydraulic passages connects said valve chamber of said first valve mechanism with said first port of said anti-lock control valve, and another of said hydraulic passages connects the valve chambers of said first and second valve mechanisms.

9. The apparatus of claim 8, wherein said hydraulic passage of said adaptor portion connects said second port of said anti-lock control valve with said reservoir via a hydraulic passage formed in said primary piston.

10. The apparatus of claim 9 wherein said reservoir includes an arm portion, said arm portion further including a hydraulic passage and a receiving cavity.

11. The apparatus of claim 10 wherein said adaptor portion includes a third receiving means for removably receiving said first port of said traction control valve.

12. The apparatus of claim 10 further comprising a traction control valve removably disposed between said arm portion of said reservoir and an upper portion of said adaptor portion, said traction control valve including opposed first and second ports.

13. The apparatus of claim 11 wherein said receiving cavity of said arm portion of said reservoir removably receives the second port of said traction control valve, wherein the hydraulic passage of said adaptor portion communicates with the hydraulic passage of said arm portion via said traction control valve.

14. A brake hydraulic pressure control apparatus providing anti-lock control for preventing the locking of vehicle wheels during braking and providing traction control to prevent slipping of the vehicle wheels during starting or accelerating of the vehicle, the apparatus comprising:
- a master cylinder assembly including a body portion, and an adaptor portion removably attached to an end of said body portion; a reservoir, said reservoir including an arm portion, wherein a hydraulic passage and a receiving cavity are formed in said arm portion;
- hydraulic passages within said master cylinder assembly;
- a distributor assembly removably attached to said master cylinder assembly, said distributor assembly including a predetermined number of control channel means for controlling vehicle wheels, a predetermined number of hydraulic passages, and a predetermined number of electromagnetic valves corresponding to the predetermined number of control channel means, said electromagnetic valves being disposed in said hydraulic passages for performing said anti-lock and traction control on said vehicle wheels;
- an anti-lock control electromagnetic valve having opposed ends and being disposed between said body portion and said adaptor portion, wherein said anti-lock control valve includes a first port supported by one of said ends of said anti-lock control valve, and a second port supported by said other end of said anti-lock control valve;
- a traction control valve removably disposed between said arm portion of said reservoir and an upper portion of said adaptor portion, said traction control valve including opposed first and second ports;
- first receiving means formed in said master cylinder body portion for removably receiving said first port of said anti-lock control valve;
- second receiving means formed in said adaptor portion for removably receiving said second port of said anti-lock control valve;
- a third receiving means formed in said adaptor means for removably receiving said first port of said traction control valve, wherein said second port of said traction control valve is removably received by said receiving cavity of said arm portion; and
- connecting means for connecting the hydraulic passages of said master cylinder assembly with said hydraulic passages of said distributor assembly when said master cylinder assembly and said distributor assembly are assembled.

* * * * *